United States Patent [19]

Zwettler

[11] 4,397,536

[45] Aug. 9, 1983

[54] AUTOMATIC CONVEYOR FOR DENTAL FILM CHIP PROCESSING

[76] Inventor: Ernst Zwettler, 1108 19th St., Santa Monica, Calif. 90403

[21] Appl. No.: 289,409

[22] Filed: Aug. 3, 1981

[51] Int. Cl.[3] .............................................. G03B 3/08

[52] U.S. Cl. ...................................... 354/322; 134/71

[58] Field of Search ...................... 354/299, 320, 322; 134/70, 71, 72, 73, 75

[56] References Cited

U.S. PATENT DOCUMENTS

| | | | |
|---|---|---|---|
| 2,545,031 | 3/1951 | Izzi | 134/71 |
| 3,599,555 | 8/1971 | Dutch | 134/75 |
| 3,624,728 | 11/1971 | Clark | 354/322 |

*Primary Examiner*—Alan Mathews

*Attorney, Agent, or Firm*—John T. Matlago

[57] ABSTRACT

A dental film processor for film chips comprises a series of developing, fixing and washing tanks having longitudinally extending moving endless belts disposed above the sides thereof. A towbar provided with side arms has a holder for film chips pivotally coupled to the lower end thereof. The side arms of the towbar are placed on the moving belts with the film holder suspended in the solution of the developing tank and the belts pull the towbar which, in turn, drags the film holder successively through the solution in each tank and over the end wall thereof into the solution of the following tank in the series.

15 Claims, 21 Drawing Figures

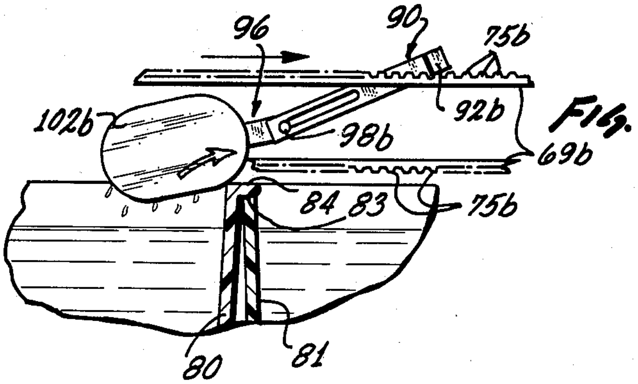
Fig. 13
Fig. 14
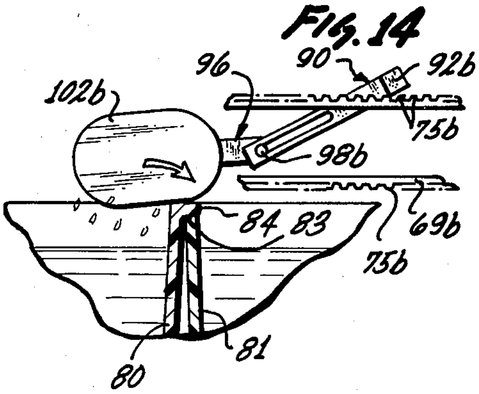
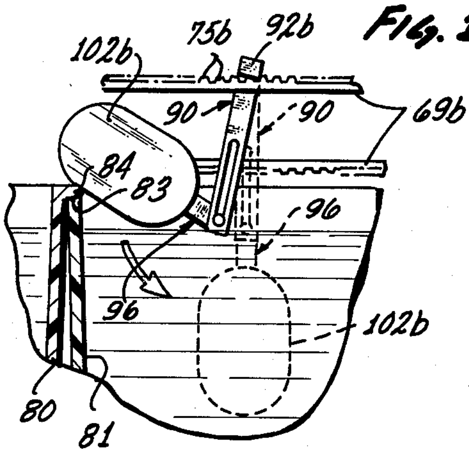
Fig. 15
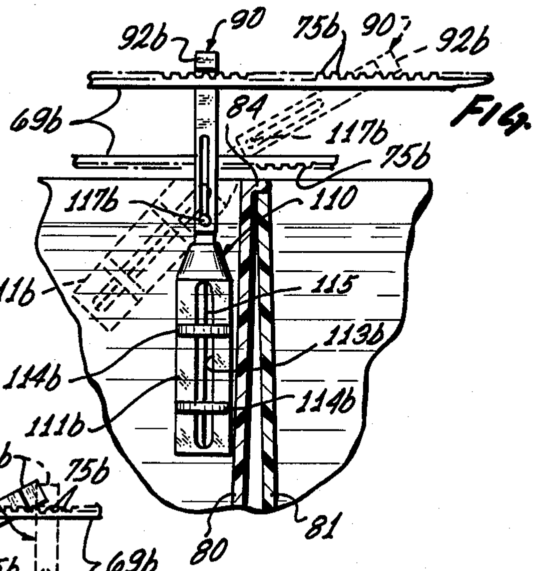
Fig. 16
Fig. 17
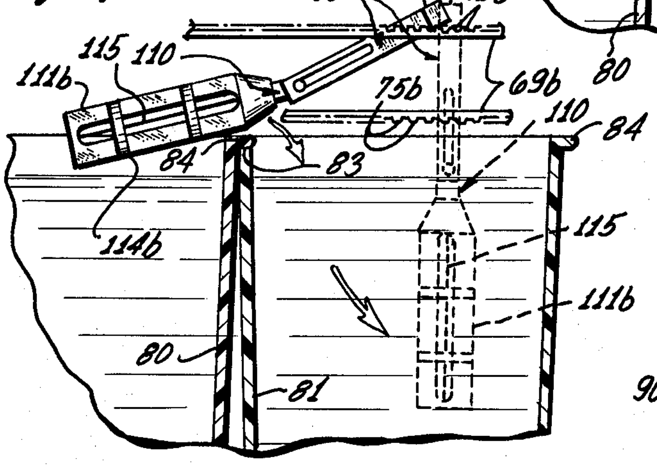
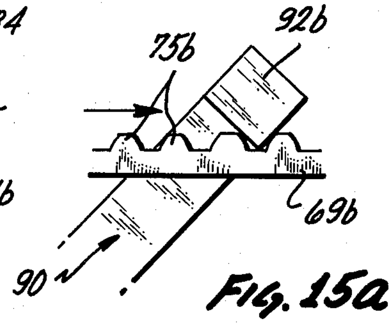
Fig. 15a

AUTOMATIC CONVEYOR FOR DENTAL FILM CHIP PROCESSING

BACKGROUND OF THE INVENTION

This invention relates to film processors and more particularly to apparatus for automatically processing dental X-ray film chips.

Automatic processors for dental X-ray film chips provide transfer devices for successively conveying film chips out of a developing tank into a fixing tank, a washing tank, and, then, through a dryer. The prior art transfer devices are typically complex and expensive mechanisms because of the need for lifting and conveying the film chips up over the end wall of each tank into the following tank.

As dental film chips are being processed in an automatic processor, it is often desired to be able to simply remove them out of the washing tank so that they can be examined more quickly. Then, if there is a need to provide a permanent record of the film chips, it is desired to be able to simply reinsert them back into the washing tank such that they can then proceed on through the dryer. The structures provided for the transfer devices of the automatic processors presently available in the art do not lend themselves to such simple withdrawal and reinsertion of the film chips at the washing tank.

SUMMARY OF THE INVENTION

In accordance with the present invention, a pair of endless belts having teeth on the outer surfaces thereof are looped about pairs of sprockets so as to be driven longitudinally above the respective sides of a series of tanks providing solutions for processing film chips. A towbar is provided having side arms with rectangularly shaped cross sectional configurations. The towbar is also provided with vertically extending spaced leg members. A holder for film chips is pivotally held on the lower ends of the leg members of the towbar. The towbar is positioned by the operator with its side arms lying on the top of the teeth of the driven endless belts such that the holder is immersed in the solution of the first tank. the endless belts pull the towbar and thus drag the holder through the solution of the first tank. When the sides of the holder contact the rear wall of the first tank, they cause the towbar to be tilted such that a corner of each of the side arms thereof resides between the teeth of the endless belts so as to drag the holder over the end wall of the first tank such that it falls into the second tank. The towbar similarly continues to drag the holder through the remaining tanks in the series. When the towbar drags the holder out of the washing tank which is the final tank of the series, it continues to drag the holder over a screen member provided on the top of a dryer compartment. When the holder clears the screen member, it falls down so as to be suspended in a dryer storage area.

Accordingly, one of the objects of the present invention is to provide a simplified structure for transferring film chips from one tank to the next and then through the dryer of an automatic processor.

Another object of the present invention is to provide an automatic dental film processor that requires little maintenance and repair.

Another object of the present invention is to provide a low cost automatic dental film processor that can readily handle all sizes of film chips.

Yet another object of the present invention is to provide an automatic dental film processor which permits the operator during the course of development to remove the dental film chips out of the washing tank and, after examining them in their wet condition, being able to reinsert them back into the washing tank so that they can proceed through the dryer to thereby provide a permanent record.

With these and other objects in view, the invention consists in the construction, arrangement and combination of the various parts of the device whereby the objects contemplated are attained as hereinafter set forth, pointed out in the appended claims and illustrated in the accompanying drawings.

BRIEF DESCRIPTION OF THE DRAWINGS

FIG. 13 is a pictorial view illustrating a holder for the film chips starting to be dragged by a towbar out of the first tank;

FIG. 14 is a pictorial view illustrating the holder for the film chips being dragged by the towbar over the top of the wall of the first tank;

FIG. 15 is a pictorial view illustrating the holder for the film chips falling into the second tank;

FIG. 15*a* is an enlarged view showing a corner of a side arm of a towbar engaged between the teeth on the belt when the towbar is caused to be tilted;

FIG. 16 is a pictorial view illustrating another holder for a larger size film chip being dragged by a towbar out of the first tank;

FIG. 17 is a pictorial view illustrating the holder in FIG. 16 being dragged by the towbar over the top of the rear wall of the first tank and falling into the second tank;

DESCRIPTION OF THE PREFERRED EMBODIMENT

Figure 1:
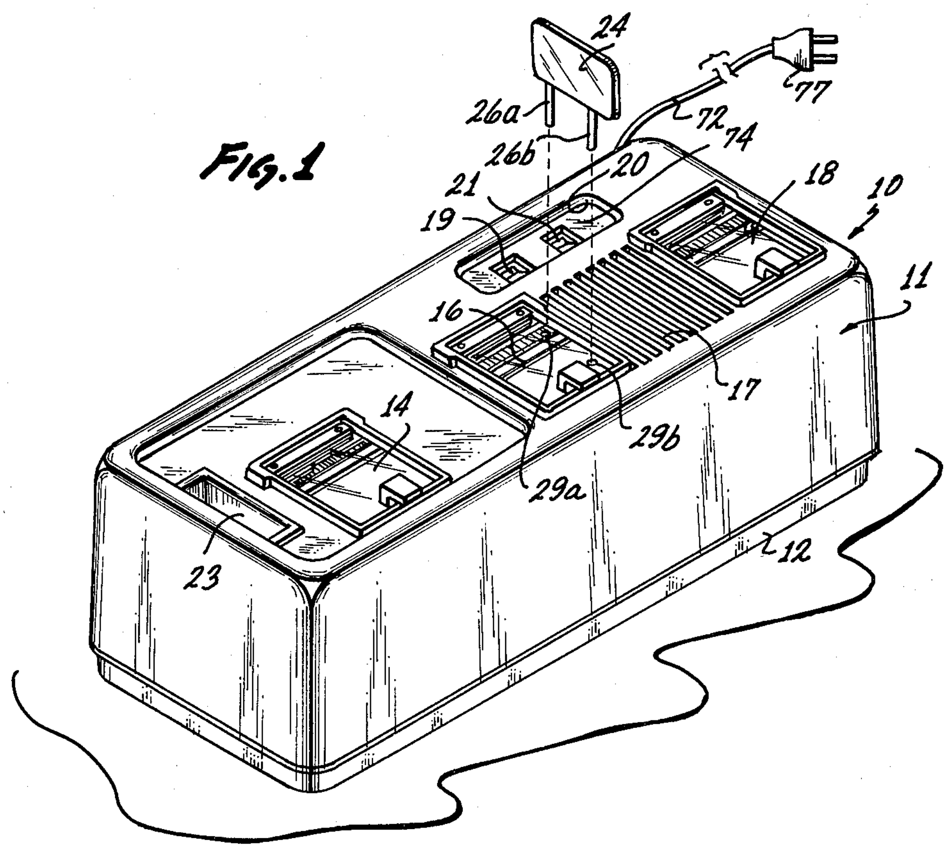
FIG. 1 is a top perspective view of the dental film processor of the present invention.

Referring to the drawings, FIG. 1 shows a perspective view of the dental film processor 10 of the present invention with the cover 11 positioned on the base 12 thereof. The top of the cover 11, which is a molded structure, is provided with a hinged door 14 near the front thereof, a hinged door 16 on the middle thereof, and a hinged door 18 on the rear thereof. A louver 17 is provided on the cover 11 between the doors 16 and 18.

The top of the cover 11 is further provided near the front end thereof with a well 23 for refuse and with an opening 20 on the rear side thereof to provide access to switches 19 and 21 on the top of a control box 74. A cord 72 having a wall plug 77 is connected to supply power to the control box 74.

Shown in FIG. 1 exploded away from the top of the cover 11 is a stop 24 in the form of a flat plate having spaced vertical legs 26*a* and 26*b*. The stop 24 can be positioned by the operator with its legs 26*a* and 26*b* inserted down into holes 29*a* and 29*b* in the door 16 when it is desired to interrupt the movement of a holder for film chips through the processor, as will be described hereinafter.

Figure 2:
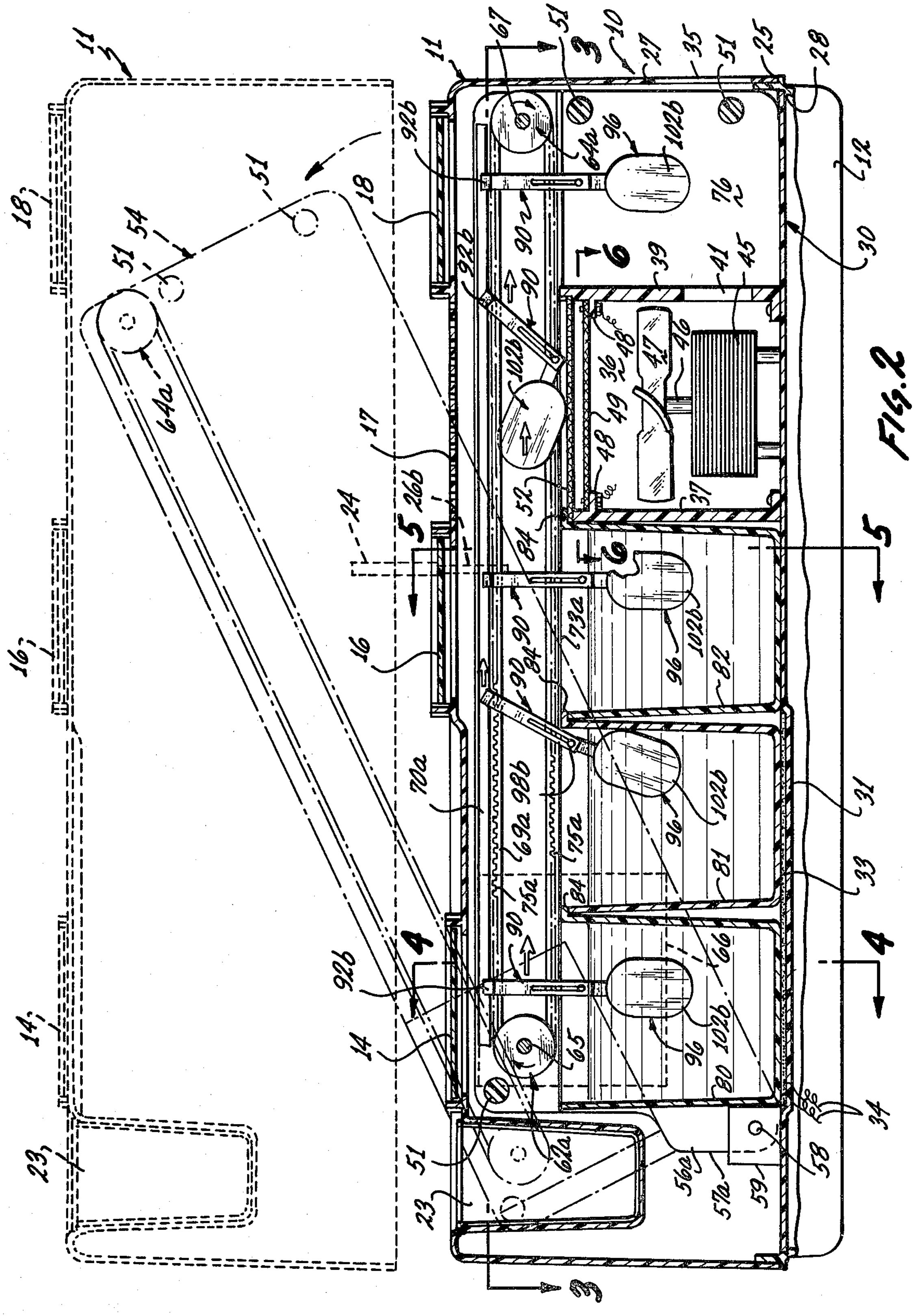
FIG. 2 is a longitudinal vertical sectional view of the processor shown in FIG. 1.

Reference will next be made to FIG. 2 which shows a longitudinal vertical sectional view of the processor 10. As seen in FIG. 2, the base 12 is molded to provide an external shoulder 25 about the outer periphery thereof on which the peripheral side wall 27 of the cover 11 rests. As indicated by dashed lines in FIG. 2, the cover 11 can be lifted off the base 12 when access is desired to the apparatus enclosed thereby.

Figure 4:
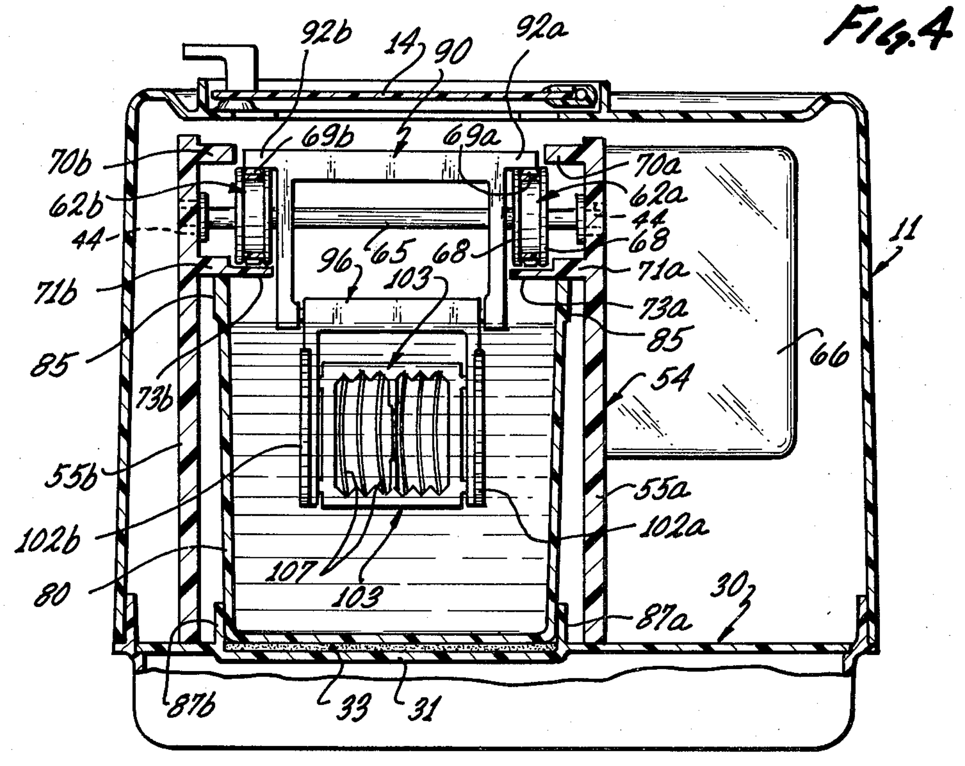
FIG. 4 is a cross sectional view thereof as taken along line 4—4 of FIG. 2.

The molded base 12 is also provided with an internal shoulder 28 which supports a molded base plate 30. The base plate 30 is provided with a recess 31 which extends along the front top portion thereof and longitudinally extending projections 87*a* and 87*b* (FIG. 4). A thin heater pad 33 is placed in the recess 31 with its upper surface flush with the remaining top surface of the base plate 11. The coils (not shown) of the heating pad 33 are provided with terminals 34 which connect to the contacts of switch 19. Located on the base plate 30 inward from the well 23 is a series of three plastic tanks 80, 81 and 82.

Figure 6:
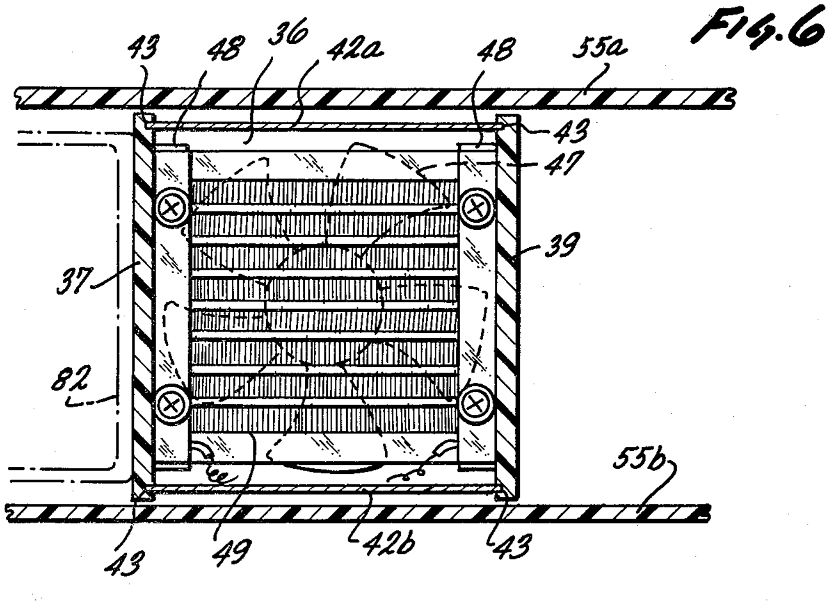
FIG. 6 is a plan view of the dryer compartment as taken along line 6—6 of FIG. 2.

Located on the base plate 30 to the rear of the last tank 82 is a dryer compartment 36 comprised of a front transverse wall 37 and a rear transverse wall 39. The walls 37 and 39 are molded with bottom flanges by which they are fastened to the base plate 30. As best seen in FIG. 6, sheet metal plates 42*a* and 42*b* are inserted in vertical slots 43 on the ends of the sides of each of the transverse walls 37 and 39 to form the sidewalls of the dryer compartment 36. Mounted on the base plate 30 within the dryer compartment 36 is a motor 45 provided with a vertical shaft 46 having a fan 47 attached on the upper end thereof. The upper end portions of the transverse walls 37 and 39 are provided with brackets 48 across which an open wire heating device 49 extends and is fastened. A relatively stiff screen member 52 is attached to extend across the tops of the transverse walls of the dryer compartment 36. A dryer storage area 76 is provided to the rear of the dryer compartment 36.

It should now be evident that when the cover 11 is in place on the base 12, the hinged door 14 is located above the first tank 80, the hinged door 16 is located above the third tank 82, the louver 17 is located above the dryer compartment 36, and the hinged door 18 is located above the dryer storage area 76.

Figure 3:
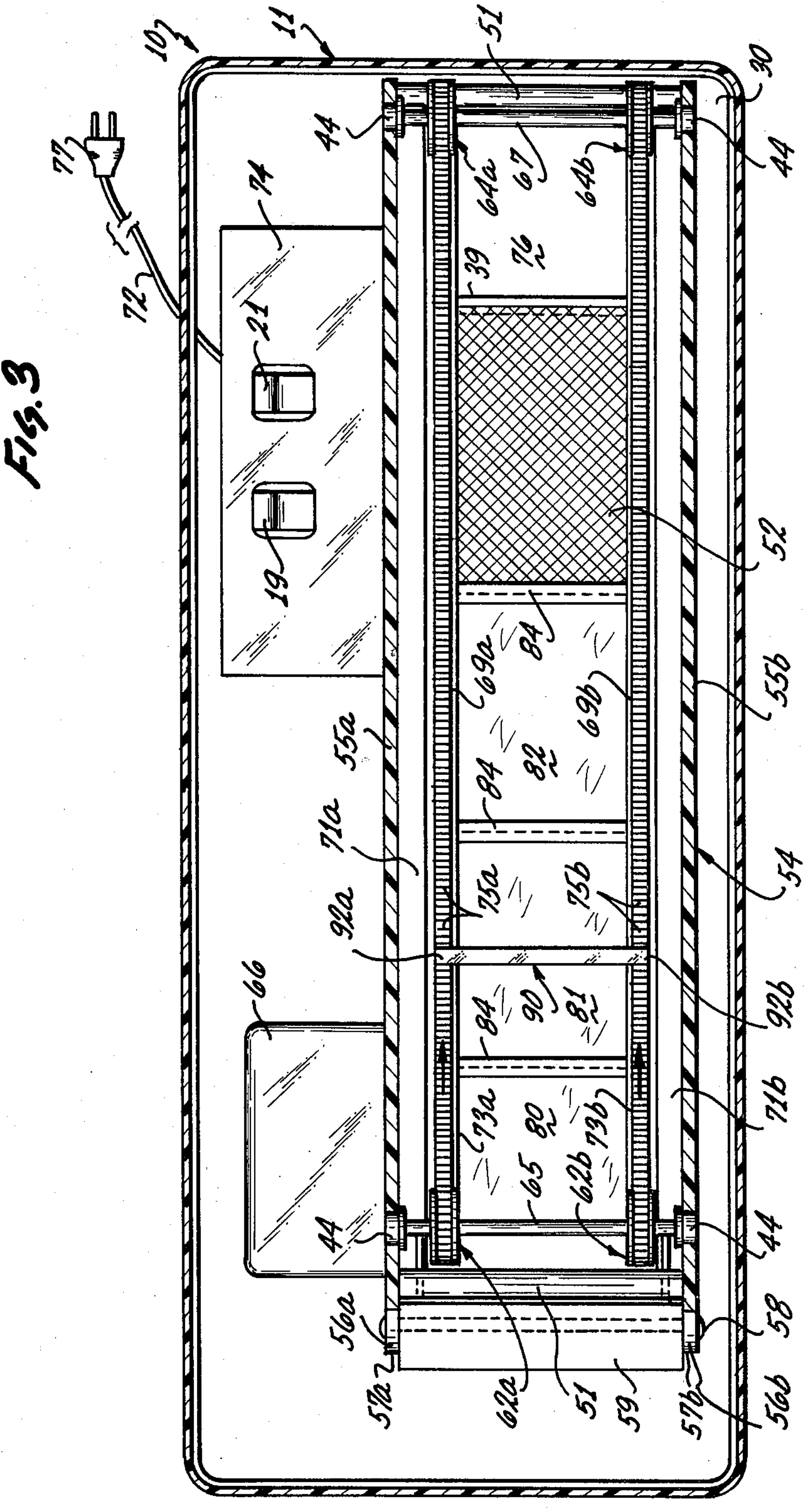
FIG. 3 is a plan sectional view of the processor as taken generally along line 3—3 of FIG. 2.

Referring to the FIGS. 2 and 3, mounted on base plate 30 is a longitudinal frame 54 comprising a pair of spaced vertical sidewalls 55*a* and 55*b* held together by upper and lower transverse rods 51 on the rear thereof (FIG. 2) and a transverse rod 51 on the upper front corner thereof. The lower front end portions of the sidewalls 55*a* and 55*b* are provided with elongated ear projections 56*a* and 56*b* having flat outer surfaces 57*a* and 57*b*. The ear projections 56*a* and 56*b* fit over the ends of a hinge member 59 preferably molded on the base plate 30. The ear projections 56*a* and 56*b* are pivotally held on hinge member 59 by a pin 58.

As best seen in FIG. 3, a shaft 65 has its ends rotatably supported in bushings 44 held in openings near the upper front corners of the sidewalls 55*a* and 55*b*. The shaft 65 carries a front pulley 62*a* spaced inward of sidewall 55*a* and a front pulley 62*b* spaced inward of sidewall 55*b*. Likewise, a shaft 67 has its ends rotatably supported in bushings 44 held in openings near the upper rear corners of sidewalls 55*a* and 55*b*. The shaft 67 carries a rear pulley 64*a* spaced inward of sidewall 55*a* and a rear pulley 64*b* spaced inward of sidewall 55*b*. The end shaft 65 near the front pulley 62*a* is suitably coupled to be driven by the shaft of a motor 66 attached to the outside of sidewall 55*a*. Attached to the outside of sidewall 55*a* toward the rear thereof is the control box 74 which houses the contacts of electrical switches 19 and 21 and a fuse.

As shown in particular on pulley 62*a* in FIG. 4, each of the pulleys 62*a*, 62*b*, 64*a* and 64*b* is provided with side flanges 68. An endless belt 69*a* provided with teeth 75*a* on the outer surface thereof (FIG. 2) is looped about the front pulley 62*a* and the rear pulley 64*a*. Likewise, an endless belt 69*b* provided with teeth 75*b* on the outside surface thereof is looped about the front pulley 62*b* and the rear pulley 64*b*. The endless belts 69*a* and 69*b* are preferably formed of rubber but may be formed of a plastic material.

As best shown in FIG. 4, molded on the inner surface of each of the sidewalls 55*a* and 55*b* just above the pulleys are short horizontally projecting guide walls 70*a* and 70*b*. Molded on the inner surfaces of sidewalls 55*a* and 55*b* just below the pulleys are short horizontally projecting clamping walls 71*a* and 71*b* having ledges 73*a* and 73*b* formed on the outer portions thereof.

Figure 19:
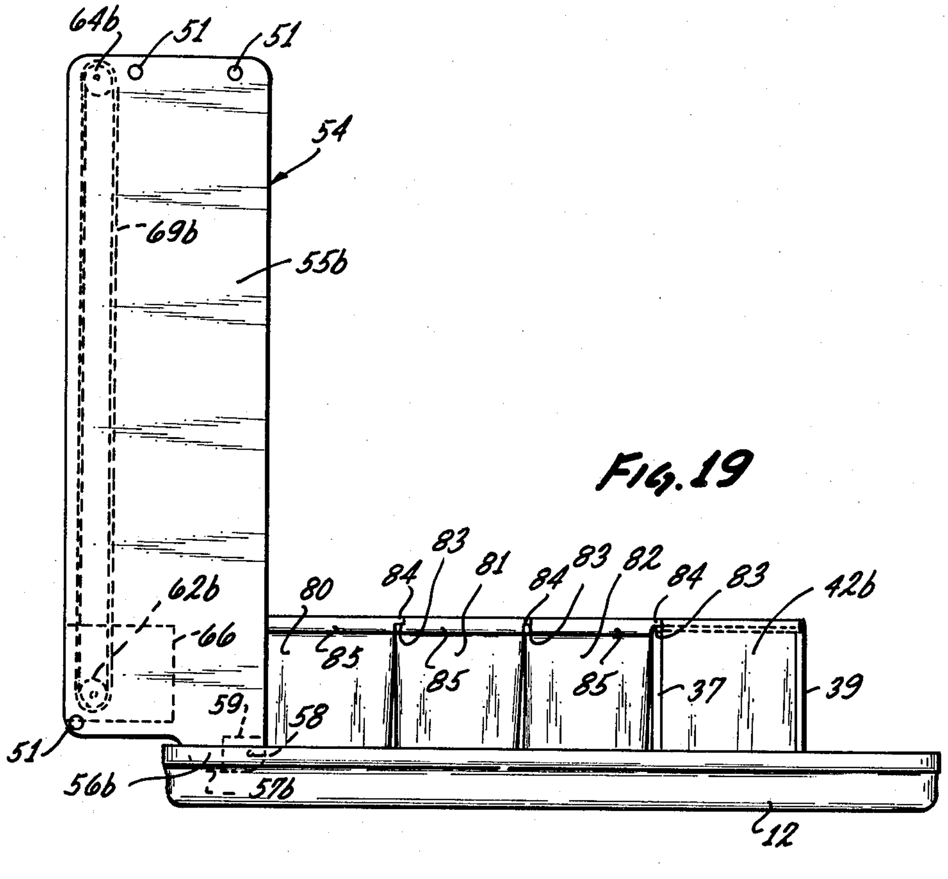
FIG. 19 is a side view showing the frame 54 swung vertically upward to obtain access to the series of tanks on the base plate.

Referring to FIG. 2, by grasping the transversely disposed rod 51 on the upper rear of the frame 54, the frame 54 can be swung upwardly on the lower front pin 58 such as to rest on the flat surfaces 57*a* and 57*b* of the elongated ear projections 56*a* and 56*b*, as shown in FIG. 19. It should be noted that when the frame 54 is so lifted the three plastic tanks 80, 81 and 82 remain in position on the base plate 30 between the transverse hinge member 59 and the front transverse wall 37 of the dryer compartment 36.

Referring to FIG. 19, it should be noted that each of the tanks 80, 81 and 82 is of the same size and each is formed with a lip 84 on the top of the rear wall thereof and with a recess 83 on the top of the front wall thereof. Thickened portions 85 comprising handle grips are provided on the upper sides thereof (FIG. 4).

In assembling the tanks on the base cover 30, the tank 82 for the washing solution is first positioned with the sides of the bottom thereof fitted within the longitudinal projections 87*a* and 87*b* extending along the lengths of the base plate 30, and with the lip 84 on the rear wall thereof fitted over a recess provided on the top of the front transverse wall 37 of the dryer compartment 36. The tank 81 for the fixing solution is then positioned adjacent the tank 82 with the sides of the bottom thereof fitted within longitudinal projections 87*a* and 87*b* and with the lip 84 on the rear wall thereof fitted over the recess 83 on the top of the front wall of tank 82. Finally, the tank 80 for the developing solution is positioned adjacent the tank 81 with the sides of the bottom thereof fitted within the longitudinal projections 87*a* and 87*b*, with the front wall thereof abutting the hinge member 59, and with the lip 84 on the rear wall thereof fitted over the recess 83 provided on the top of the front wall of tank 81.

It should now be clearly understood that the tanks 80, 81 and 82 are held in a fixed position transversely and longitudinally on the base plate 30. The lips 84 on the tanks extend over the cracks between the walls of the adjacent tanks and the front transverse wall 37 of the dryer compartment 36, thus ensuring that none of the solution that adheres to the holder or the film chips upon being transferred out of a tank will drain down onto the base plate 30.

Now then, when by holding onto the transversely disposed upper rear rod 51, the frame 54 is pivoted downwardly on pin 58 such that the bottoms of its sidewalls 55*a* and 55*b* rest on the top surface of the base plate 30, the lower horizontally projecting clamping walls 71*a* and 71*b* on the sidewalls 55*a* and 55*b* engage the tops of the sides of tanks 80, 81 and 82 securing them down on the base plate 30, as shown in FIG. 4.

It should now be further noted that the ledges 73*a* and 73*b* on the clamping walls 71*a* and 71*b* serve to support the lower portions of the loops of the endless side belts 69*a* and 69*b* so that if they tend to sag, the teeth 75*a* and 75*b* on the outer surfaces thereof will not engage the upper edges of the front and rear walls of the tanks.

Figure 7:
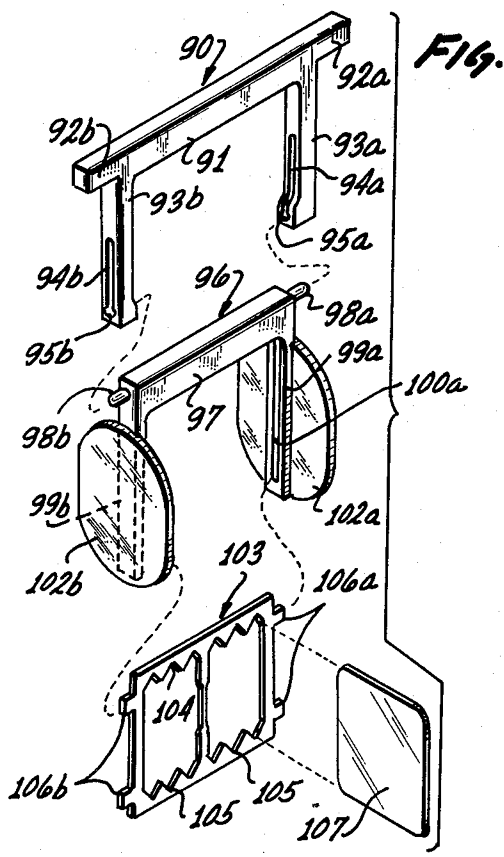
FIG. 7 is an exploded view of a towbar together with a holder having a carriage for small size film chips.

Reference will next be made to FIG. 7 which shows a towbar 90 together with a film holder 96 provided with a removable carriage 103 capable of retaining thereon a plurality of smaller size film chips 107.

As noted, the towbar 90 comprises a top transverse member 91 formed with arms 92*a* and 92*b* on the ends thereof. It should be especially noted that each of the arms 92*a* and 92*b* has a rectangularly shaped cross sectional configuration. The transverse member 91 also has a pair of leg members 93*a* and 93*b* extending downwardly therefrom. The leg members 93*a* and 93*b* are provided with elongated slots 94*a* and 94*b* having slightly enlarged circular openings 95*a* and 95*b* on the lower ends thereof. The film chip holder 96 comprises a top transverse member 97 with pins 98*a* and 98*b* on the ends thereof and a pair of leg members 99*a* and 99*b* having elongated slots 100*a* and 100*b* on the inside surfaces thereof. The leg members 99*a* and 99*b* have preferably integrally formed thereon generally ovally shaped side plates 102*a* and 102*b*. The carriage 103 is in the form of a thin rectangular plastic frame having the inner edges of the upper and lower sides thereof provided with pairs of opposing vee grooves 104 and 105 which are spaced to engage the opposite edges of a slightly bowed film chip 107.

Figure 9:
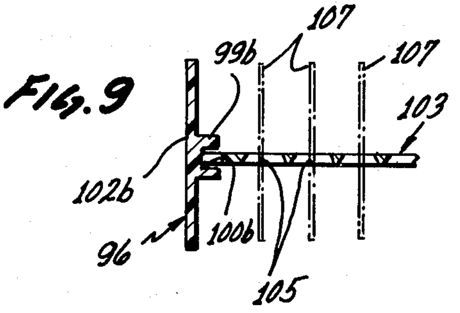
FIG. 9 is a sectional view of the holder taken along line 9—9 of FIG. 8.

As shown, the carriage 103 has side projections 106*a* and 106*b* near the outer corners thereof by which it is engaged in the elongated slots 100*a* and 100*b* on the inner surfaces of the leg members 99*a* and 99*b* (FIG. 9).

Figure 8:
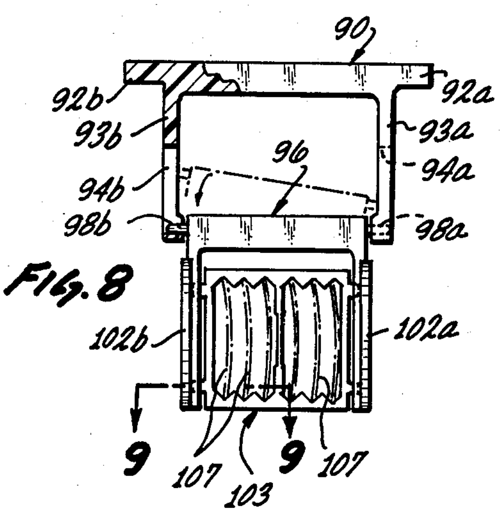
FIG. 8 is an assembly view of the towbar, the holder and the carriage shown in FIG. 7.

It should now be clearly understood, as shown in FIG. 8, that the film chips 107 to be processed are positioned on the carriage 103 transversely to the plane thereof. The film chips 107 are so positioned on the carriage 103 that their edges do not extend beyond the outer boundaries of the ovally shaped side plates 102*a* and 102*b*. The carriage 103 is mounted on the holder 96. The holder 96 is then mounted, in turn, on the leg members 93*a* and 93*b* of the towbar 90 by first holding its transverse member 97 at an angle, as shown, to insert the pivot pins 98*a* and 98*b* in the longitudinal slots 94*a* and 94*b*, and then pulling the pivot pins down so that they are freely held in the enlarged openings 95*a* and 95*b* on the lower ends of the leg members 93*a* and 93*b*.

Figure 10:
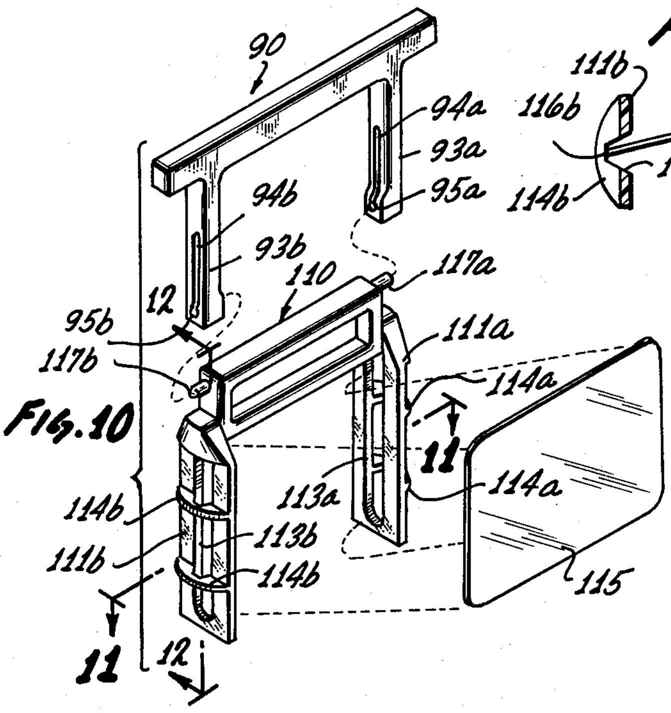
FIG. 10 is an exploded view of a towbar together with a holder for a larger size film chip.
Figure 11:
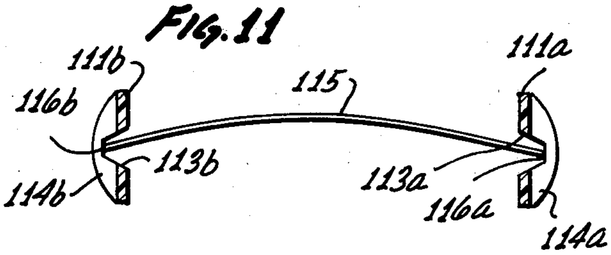
FIG. 11 is a sectional view of the holder taken along line 11—11 of FIG. 10.
Figure 12:
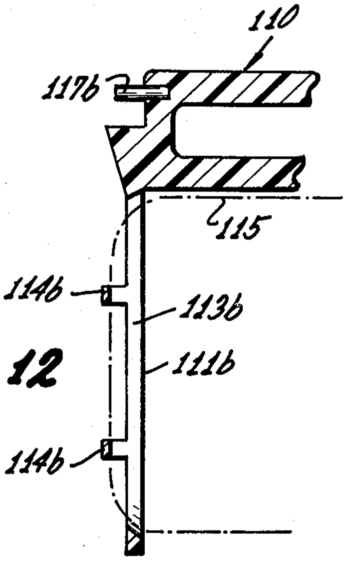
FIG. 12 is a sectional view of the holder taken along line 12—12 of FIG. 10.

Shown in FIG. 10 is an exploded view of the towbar 90 and a holder 110 adapted for holding a larger size film chip 115. In this holder 110, the leg members 111*a* and 111*b* may be rectangularly shaped at the bottom and tapered inwardly at the top. An elongated slot 113*a* and 113*b* extends through the leg members 111*a* and 111*b*. A pair of cross members 114*a* having vee notches 116*a* thereon are provided on leg member 111*a* and a pair of cross members 114*b* having vee notches 116*b* thereon are provided on leg member 111*b*. The vee notches 116*a* and 116*b* provide for engaging the side edges of a large size bowed film chip 115, as shown in FIGS. 11 and 12. This open construction assures that the side edge portions of the film chip 115 are exposed to the solutions in the tanks. It should be noted that the shape of the leg members 111*a* and 111*b* are wide enough to assure that no part of the film chip 115 extends beyond the outer boundaries thereof.

The holder 110 with the film chip 115 held in the vee notches 116*a* and 116*b* on the leg members 114*a* and 114*b* thereof is mounted with its pins 117*a* and 117*b* freely pivotally held in the enlarged circular openings 95*a* and 95*b* on the lower end portions of the slots 94*a* and 94*b* of the towbar 90.

To prepare the processor 10 for operation, the cover 11 is lifted off the base 12. The frame 54 is then swung upwardly about pin 58, by use of the upper rear transverse rod 51, to its vertical position, as shown in FIG. 19. The tanks 80, 81 and 82 are then each filled with a suitable processing solution to the level of the handle grasps 85 on the sides thereof. The frame 54 is then swung down by use of the transverse rod 51 such that its sidewalls 55*a* and 55*b* rest on the base plate 30. The switch 19 is then closed to energize the heating pad 33 to warm up the solutions in the tanks 80 and 81. A sensor (not shown) may be provided to control the temperature of the solutions in these tanks. After the solutions in the tanks 80 and 81 have warmed up to a desired temperature, the switch 21 is closed to energize the heater device 49 in the dryer compartment 36, to supply electrical power to the motor 45 for advancing the endless belts 69*a* and 69*b*, and to supply electrical power to the motor 45 for rotating the fan 47.

It should be noted that the fan 47 causes air drawn in the openings 35 in the back of the cover 11 and through openings 41 in the rear transverse wall 39 of the dryer compartment 36 to be directed upwardly past the heater device 49 and then past the screen member 52 on the top of the dryer compartment 36, and then out through the louver 17 on the top of the cover 11.

Figure 18:
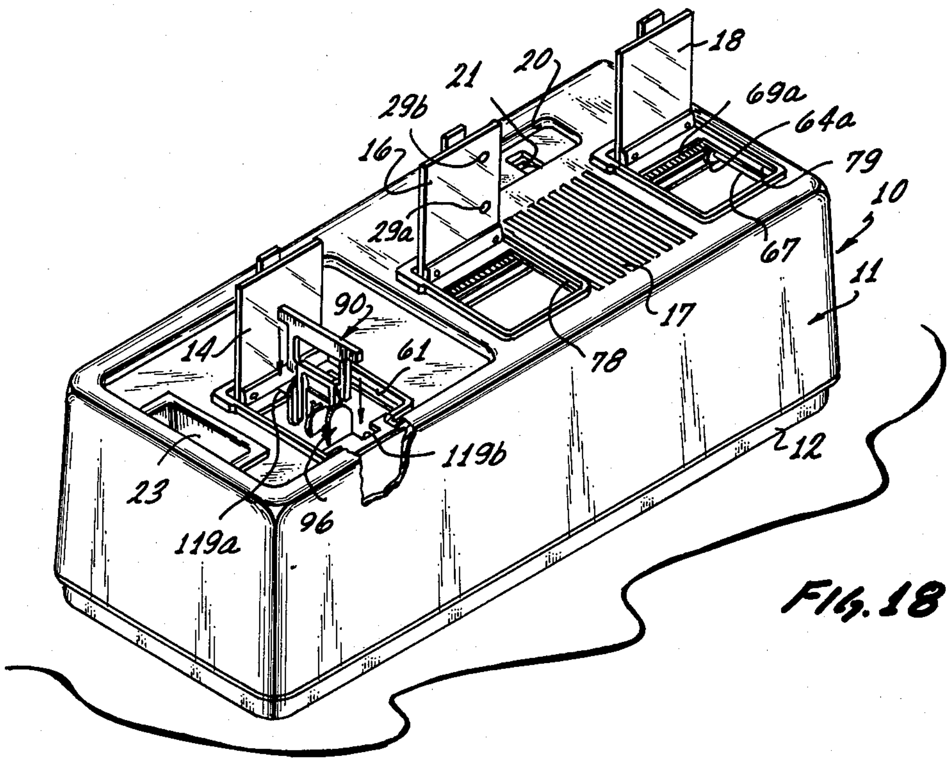
FIG. 18 is a top perspective view of the processor with the doors on the cover therefor opened.
Figure 20:
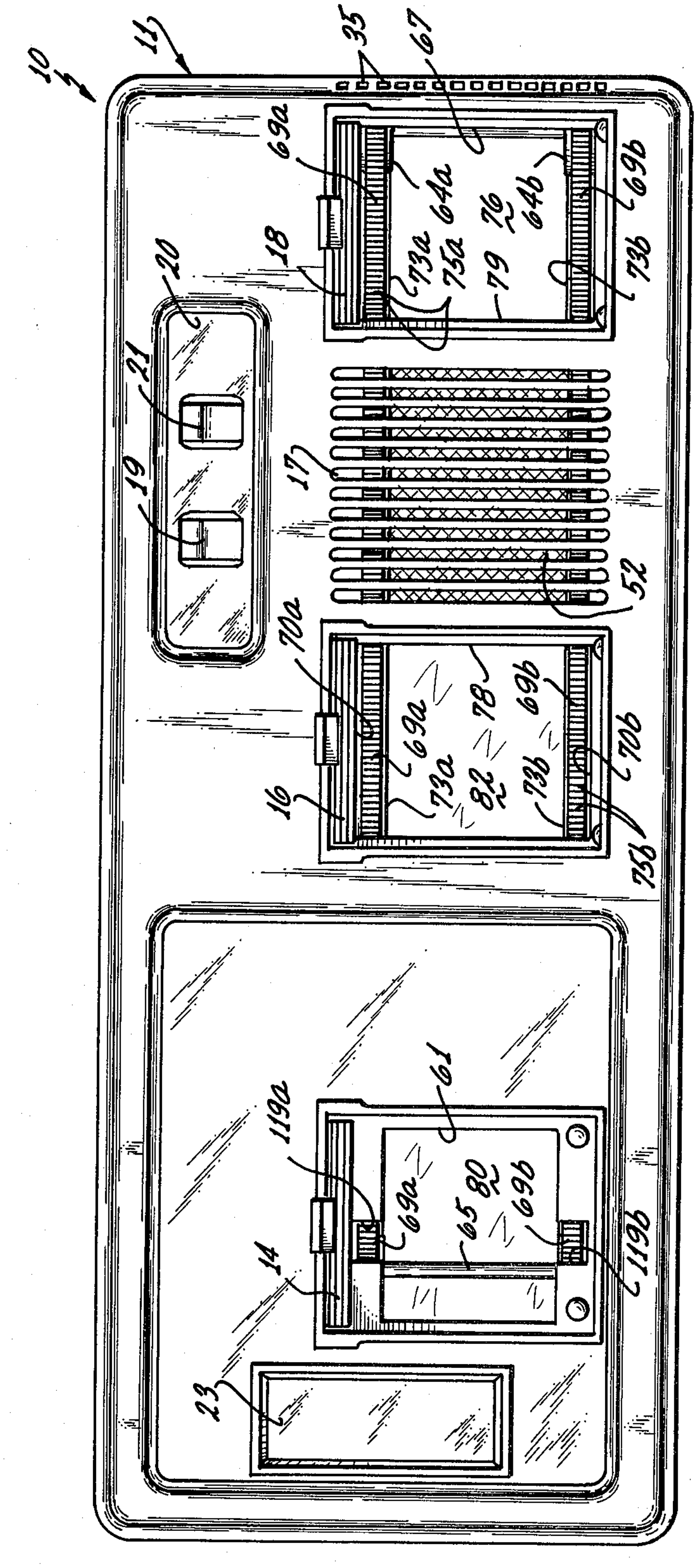
FIG. 20 is a top plan view of the processor with the doors on the cover opened.

Referring to FIGS. 18 and 20, with the hinged door 14 opened, the loading port 61 is seen to have slots 119*a* and 119*b* on the sides thereof. A towbar 90 carrying a film holder 96 with film chips 107 in the carriage 103 thereof has its arms 92*a* and 92*b* positioned by the operator through the side slots 119*a* and 119*b* in the loading port 61 so as to rest on the teeth 75*a* and 75*b* of the endless side belts 69*a* and 69*b*. Note that the side slots 119*a* and 119*b* on the loading port 61 assure that the towbar 90 is properly positioned in the tank 80 with respect to the front end thereof so that the film chips 107 will remain in the developing solution of the tank 80 long enough to properly develop the film chips 107, i.e., so that the film chips will not be over or under developed. On the other hand, the port 78 above the washing tank 82 and the port 79 above the dryer storage area 76 are made wider throughout the length thereof, i.e., they are not provided with positioning side slots since it is permissable to remove the towbar 90 from or reinsert it into these ports at any point along the length thereof.

It should be noted in FIGS. 4 and 20, that the upper horizontally projecting guide walls 70*a* and 70*b* on the inner surfaces of the sidewalls 55*a* and 55*b* of the frame 54 provide for the side arms 92*a* and 92*b* of the towbar 90 to be properly transversely positioned on the teeth 75*a* and 75*b* of the belts 69*a* and 69*b*. Furthermore, the guide walls 70*a* and 70*b* limit any transverse shifting of the arms 92*a* and 92*b* of the towbar 90, i.e., they effectively guide the towbar 90 as it is pulled by the endless side belts 69*a* and 69*b* through the processor.

As illustrated in FIG. 2, when a holder 96 being carried by a towbar 90 is vertically suspended in a tank the side arms 92*a* and 92*b* of the towbar 90 are carried through the solution in the tank by the flat bottoms thereof frictionally engaging the flat tops of teeth 75*a* and 75*b* on the moving belts 69*a* and 69*b*. Note that the width of each of the side arms 92*a* and 92*b* is such as to extend over two of the teeth 75*a* and 75*b*. Such a small frictional engagement is sufficient to drag the holder 96 with the film chips 107 through the solution in a tank.

When the edges of the side plates 102*a* and 102*b* of the holder 96 contact the rear wall of a tank, such as tank 80, as shown in FIG. 2, the side arms 92*a* and 92*b* on the towbar 90 are tilted such that a respective one of the lower corners of each settles in and is held between the teeth 75*a* and 75*b* of the belts 69*a* and 69*b*, as illustrated in FIG. 15*a*. Thus, the moving belts 69*a* and 69*b* continue to pull the towbar 90 and drag the holder 96 pivotally held on the lower ends of the leg members 93*a* and 93*b* thereof upwardly over the lip 84 on the top of the rear wall of the tank 80, as illustrated in FIGS. 13 and 14. It should now be appreciated that the load on a towbar 90 increases when it drags the holder 96 over the rear wall of the tank 80 and the tilting of a respective corner of the arms 92*a* and 92*b* into the space between the teeth 75*a* and 75*b* effectively locks the towbar 90 on the moving belts 69*a* and 69*b* during this time.

It should be noted that the side belts 69*a* and 69*b* move very slowly as they drag the towbar 90 and the holder 96 connected thereto thus giving their surfaces an opportunity to drain off most of the solution adhering thereon. When the edges of the side plates 102*a* and 102*b* of the pivotally held holder 96 clear the lip 84 of the tank 80, as illustrated in FIG. 15, the holder 96 falls down into the fixing solution in tank 81. Upon falling into the tank 81, the towbar 90 resumes its vertical position wherein the flat bottoms of the arms 92*a* and 92*b* once again are carried on the tops of the teeth 75*a* and 75*b* of the belts. The towbar 90 thus successively drags the film holder 96 from tank 80 into tank 81 and, then, from tank 81 into tank 82.

It should now be clear that a new towbar 90 with a holder 96 pivotally connected thereto can be loaded into the port 67 once the previously loaded towbar 90 has been sufficiently moved forward by the belts 69*a* and 69*b* such that the new towbar 90 does not interfere with the movement of the holder 96 on the previously loaded towbar 90 over the top of the rear wall of the tank 80. Thus, a new towbar 90 can be inserted in the loading port 67 when the holder 96 being dragged by the previous towbar 90 has advanced toward the top of the rear wall of the tank 80.

After a film holder 96 is dragged by a towbar 90 over the lip 84 on the top of the rear wall of the washing tank 82, as illustrated in FIG. 2, the side plates 102*a* and 102*b* on the holder 96 are dragged along the surface of the screen member 52 provided on the top of the dryer compartment 36, past which the air heated by the heating device 49 flows, thus serving to dry the film chips 107. When the film holder 96 has been dragged by the towbar 90 such that the holder 96 is vertically suspended in the dryer storage area 76, upon the arms 92*a* and 92*b* of the towbar contacting the rear pulleys 64*a* and 64*b*, the arms 92*a* and 92*b* tend to hang up on the flanges 68 thereof, and thus readily slide above the teeth 75*a* and 75*b* of the moving side belts 69*a* and 69*b*. A towbar 90 carrying a film holder 96 may be left in the dryer storage area 76 as long as desired without disrupting the operation of the processor.

It should be especially noted that the providing of a holder 96 for the film chips 107 to be freely pivotally held by its top side pins 98*a* and 98*b* in the openings 95*a* and 95*b* on the lower ends of the leg members 93*a* and 93*b* of a towbar 90 is of great advantage in that such pivoting enables the holder 96, and, therefore, the film chips 107 to fall much faster into the tank 81, once the holder 96 has been dragged out of the tank 80, for example, as illustrated in FIG. 15. In other words, if such a joint were not provided and the connection of the holder and the towbar were fixed relative to each other, it would take much longer for the bottom end of the side plates 102*a* and 102*b* of the holder 96 to clear the lip 84 on the top of the rear wall of the tank 80 and fall into the tank 81.

It should be noted that the second and third hinged doors 16 and 18 on the cover 11 are preferably made of transparent plastic, thus enabling the operator to look therethrough to determine if a towbar 90 has advanced to the washing tank 82 or the dryer storage area 76.

Figure 5:
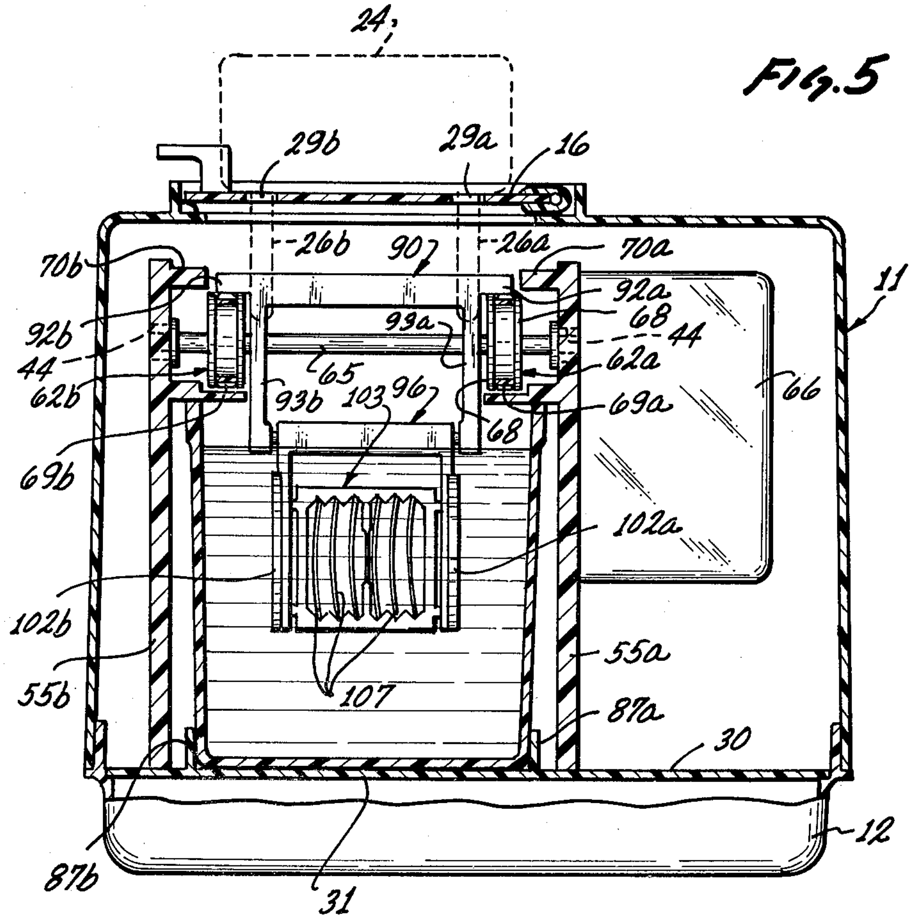
FIG. 5 is a cross sectional view thereof as taken along line 5—5 of FIG. 2.

If the operator does not want to have to watch for a towbar 90 to advance into the washing tank 82, he can, as shown in dotted lines in FIGS. 2 and 5, insert the legs 26*a* and 26*b* of the stop 24 in the openings 29*a* and 29*b* on the hinged door 16 while it is closed. Thus, the operator can continue on with his other duties and when the transverse member 91 of the towbar 90 contacts the legs 26*a* and 26*b* of the stop 24, the side arms 92*a* and 92*b* thereof slide on the tops of the teeth 75*a* and 75*b* of the moving belts 69*a* and 69*b*, and the towbar 90 remains in that position in the washing tank 82. Then, the operator, at his convenience, can first remove the stop 24 and then open the hinged door 16 to remove the towbar 90 and examine the wet film chips 107 carried in the holder 96.

The operator may now either discard the wet film chips 107 if he does not want to keep them, or he can replace them back into the washing tank 82 by positioning the arms 92*a* and 92*b* of the towbar 90 back onto the moving belts 69*a* and 69*b* at any position along the length of the port 78, thereby letting the towbar 90 continue to drag the holder 96 out of the washing tank 82 and over the screen member 52 provided on the top of the dryer compartment 36 into the dryer storage area 76.

It should now be clearly understood from FIGS. 10 and 11 that the holder 110 provided for a larger size film chip 115 is adapted to be pivotally attached to a towbar 90 by its side pins **117*a* and 117*b*. Thus, when the hinged door 14 is opened, the towbar 90 can be placed through the side slots 119*a* and 119*b* of the loading part 61 with its arms 92*a* and 92*b* resting on the teeth 75*a* and 75*b* of the moving side belts 69*a* and 69*b*** and advanced in the same manner through the processor.

The motor 66, which may be a one rpm motor, for example, is coupled by gearing (not shown) to rotate the sprockets **62*a* and 62*b* to advance the belts 69*a* and 69*b*, such that it takes approximately 2 to 2½ minutes, once its arms 92*a* and 92*b* have been placed through the side slots 119*a* and 119*b* of the loading port 61 onto the tops of the moving side belts 69*a* and 69*b*, to move the towbar 90 such that the holder 96 is transferred into the middle of the washing tank 82. If the towbar 90 is left on the belts 69*a* and 69*b* and holder 96 is permitted to be advanced therefrom over the dryer compartment 36 and into the dryer storage area 76, it takes approximately 2 to 2½ minutes more time. In other words, the overall time required to process the film chips 107** through the processor including the drying thereof is on the order of four to five minutes.

Thus, the capability of being able to remove the towbar 90 from the processor at the washing tank 82 practically cuts in half the time the operator must wait to examine the film chips 107. This is of great advantage in advising a dentist more quickly once he has taken an X-ray of the mouth of a patient as to how his work is progressing.

Although the description herein has been concerned with a particular illustrative embodiment, it is to be understood that the invention is subject to various modifications in both the construction and arrangement thereof without departing from the spirit thereof. The invention, therefore, should be considered as including all possible modifications and variations coming within the scope of the invention as defined in the appended claims.

What is claimed is:

1. A processor for dental film chips comprising:
a base;
a series of tanks containing processing solutions positioned on said base;
longitudinally extending vertical sidewalls disposed on said base on either side of said series of tanks;
a pair of sprockets mounted on the inner upper front and rear corners of each of said sidewalls;
endless belts looped about each of the pairs of sprockets;
said belts having teeth on the outer surfaces thereof;
a motor for driving said sprockets to advance said belts;
a towbar having transversely disposed side arms;
a film holder for film chips;
said film holder pivotally coupled to the lower end of said towbar; and
said towbar positioned with its arms lying on the teeth of the endless belts and with said pivotally held film holder suspended in the solution in the first tank of the series of tanks;
whereby as said belts advance they pull the towbar and thereby drag the film holder through the solution of and over the end wall of each of the tanks into the following tank in the series.

2. A processor for dental film chips as defined in claim 1 wherein a dryer compartment is provided on said base following the final tank in said series;
said dryer compartment having a screen member extending over the top thereof;
whereby said towbar provides for dragging said film holder out of the final tank in the series and over the screen member into a dryer storage area.

3. A processor for dental film chips as defined in claim 1 wherein said base is provided with a recess below the first and second tanks in the series; and
a heating pad is disposed in said recess.

4. A processor for dental film chips as defined in claim 1 wherein said sidewalls are pivotally connected by their lower front ends to the base and can be swung upwardly to a vertical position thereby providing access to said series of tanks on said base.

5. A processor for dental film chips as defined in claim 4 wherein an inwardly extending lower flange is provided on each of said sidewalls just below said belts;
said lower flanges positioned to contact the tops of the series of tanks and hold them down on the base when the sidewalls are swung downwardly on said base.

6. A processor for dental film chips as defined in claim 5 wherein said lower flanges include ledges which serve to support the lower portions of said endless loops of belts.

7. A processor for dental film chips as defined in claim 1 wherein an inwardly extending upper flange is provided on each of the sidewalls just above said belts;
said upper flanges provided for controlling the transverse position of the side arms of the towbar as it is being pulled by said belts.

8. A processor for dental film chips as defined in claim 1 wherein a cover is provided to enclose the sidewalls and rest on said base;
said cover having a door which covers a loading port over the first tank in said series; and
said loading port having side slots adjacent the front portion of said tank through which the side arms of the towbar can be positioned to lie on the belts.

9. A processor for dental film chips as defined in claim 8 wherein said cover has a door which covers a port over the final tank.

10. A processor for dental film chips as defined in claim 9 wherein said door above the final tank has a pair of holes therein, and a stop having a pair of leg members for insertion in said holes to stop a towbar from being advanced out of said final tank by said moving belts.

11. A processor for dental film chips as defined in claim 1 wherein each of said tanks has a recess on the top of the front wall thereof and a lip on the top of the rear wall thereof whereby when said tanks are positioned in series on said base the lip of each tank rests on the recess of the adjacent tank.

12. A processor for dental film chips as defined in claim 8 wherein a storage area is provided on said base following the dryer compartment and said cover has a door which covers a port over the storage area.

13. A processor for dental film chips as defined in claim 1 wherein the arms of said towbar have a generally rectangular cross sectional configuration; and wherein said teeth are spaced on said belts such that when said towbar is in a vertical position the side arms are positioned on the tops of the teeth of the belts and when said towbar is tilted upon said film holder contacting the wall of a tank a corner of each of said arms engage in the space between said teeth.

14. A processor for dental film chips, the combination comprising:

a series of tanks containing processing solutions;

means for supporting endless belts to extend longitudinally along the sides of and above the series of tanks;

said belts having teeth on the outer surfaces thereof;

means for advancing said belts;

a transversely disposed towbar having side arms;

a film holder for film chips pivotally coupled to the lower end of said towbar;

said towbar having its side arms supported on the tops of the teeth of said moving belts when said film holder is vertically suspended in a tank;

whereby, as said towbar is pulled by said belts, when the film holder contacts the wall of a tank, the towbar tilts causing a corner of each of the side arms thereof to engage a space between the teeth on the belts; and whereby when the film holder clears the wall of the tank the film holder pivots downwardly in a vertically suspended position in the following tank and the arms of the towbar are again supported on the top of the teeth of the moving belts.

15. A processor for dental film chips, the combination comprising:

a series of tanks containing processing solutions;

means for supporting endless belts to extend longitudinally along the sides of and above the series of tanks;

means for continually advancing said belts;

towing means having side arms on the upper ends thereof engaged to be pulled by said belts;

said towing means having leg members; and holder means for film chips;

said holder means having its upper sides pivotally engaged on the lower ends of the leg members of said towing means;

whereby as the holder means is dragged by said advancing belts over the end wall of a tank the holder means pivots on the lower ends of the leg members of the towing means to enable the holder means to clear said end wall and fall so as to become vertically suspended in the central portion of the succeeding tank.

* * * * *